United States Patent [19]

Dorey et al.

[11] 4,047,162
[45] Sept. 6, 1977

[54] INTERFACE CIRCUIT FOR COMMUNICATING BETWEEN TWO DATA HIGHWAYS

[75] Inventors: Howard Anthony Dorey, Godalming; Robert John Cooke, Farnborough, both of England

[73] Assignee: The Solartron Electronic Group Limited, Farnborough, England

[21] Appl. No.: 572,052

[22] Filed: Apr. 28, 1975

[30] Foreign Application Priority Data

May 2, 1974 United Kingdom ............... 19366/74

[51] Int. Cl.² .............................................. G06F 3/04
[52] U.S. Cl. .................................................. 364/200
[58] Field of Search ................. 340/172.5; 179/15 AL

[56] References Cited

U.S. PATENT DOCUMENTS

| | | | |
|---|---|---|---|
| 3,238,506 | 3/1966 | Jung et al. | 340/172.5 |
| 3,374,465 | 3/1968 | Richmond et al. | 340/172.5 |
| 3,386,082 | 5/1968 | Stafford et al. | 340/172.5 |
| 3,480,914 | 11/1969 | Schlaeppi | 340/172.5 |
| 3,510,844 | 5/1970 | Aranyi et al. | 340/172.5 |
| 3,680,053 | 7/1972 | Cotton et al. | 340/172.5 |
| 3,699,529 | 10/1972 | Beyers et al. | 340/172.5 |
| 3,750,110 | 7/1973 | Martin et al. | 340/172.5 |
| 3,753,234 | 8/1973 | Gilbert et al. | 340/172.5 |
| 3,768,074 | 10/1973 | Sharp et al. | 340/172.5 |
| 3,815,099 | 6/1974 | Cohen et al. | 340/172.5 |

*Primary Examiner*—Melvin B. Chapnick
*Attorney, Agent, or Firm*—William R. Sherman; Kevin McMahon; Martin M. Novack

[57] ABSTRACT

An interface circuit for use in a data transmission system is designed to be used not only between a highway and a device but also to link highways and can be commanded to enter a status in which commands sent to it on one highway are modified and sent out as commands on a second highway so that a controller device on the one highway can control devices not only on that highway but also on the second highway, with extension, if desired, to a third highway or beyond. To achieve this, the interface circuit has two ports each for connection to a respective one of two substantially identical highways, and status control means responsive to signals received at either port to establish different statuses of the interface. For inter-highway communication, the status control means is responsive to a command signal of particular form at either port to produce a modified command signal at the other port.

11 Claims, 7 Drawing Figures

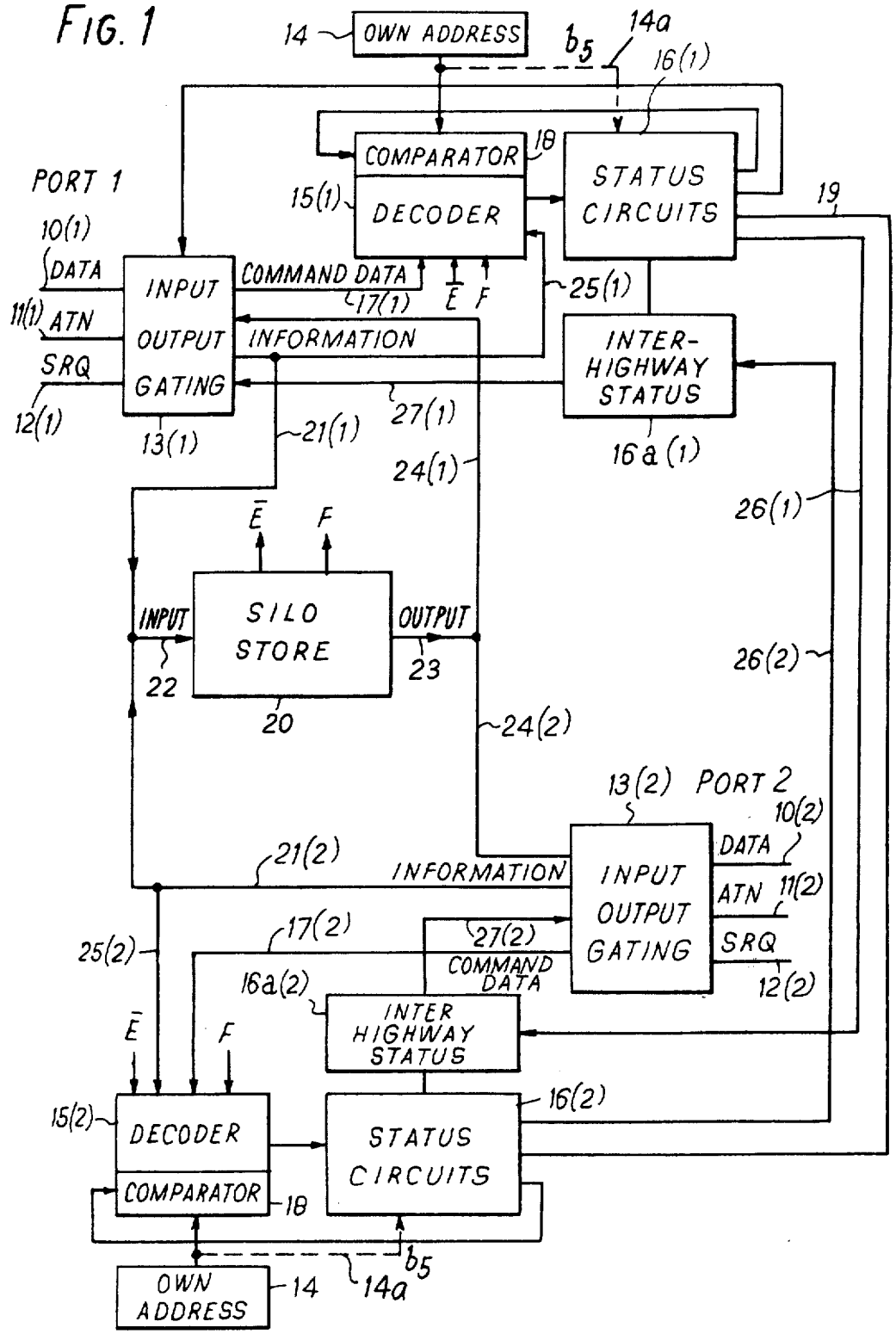

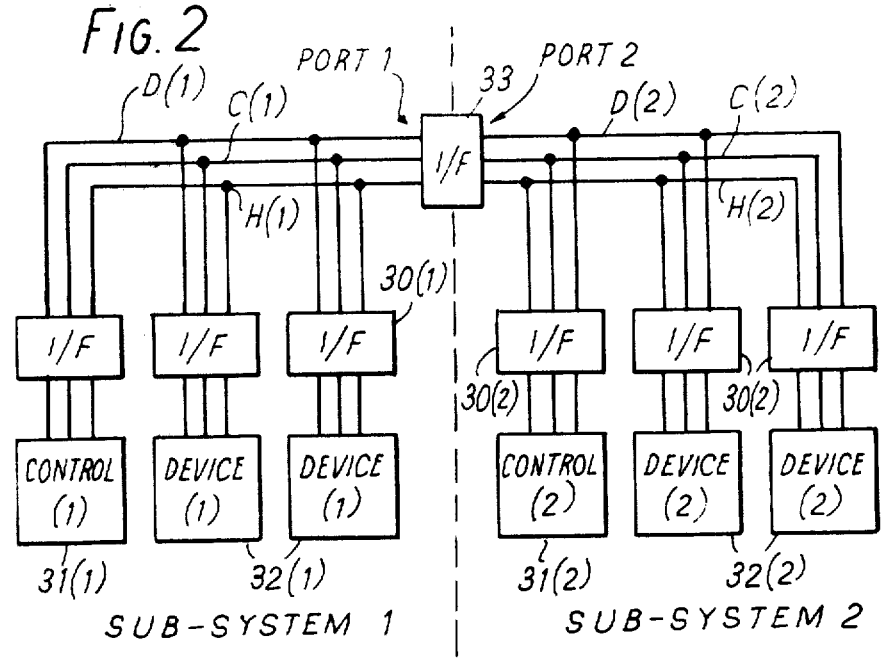
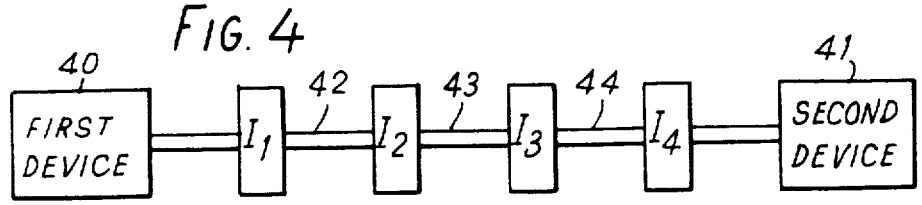
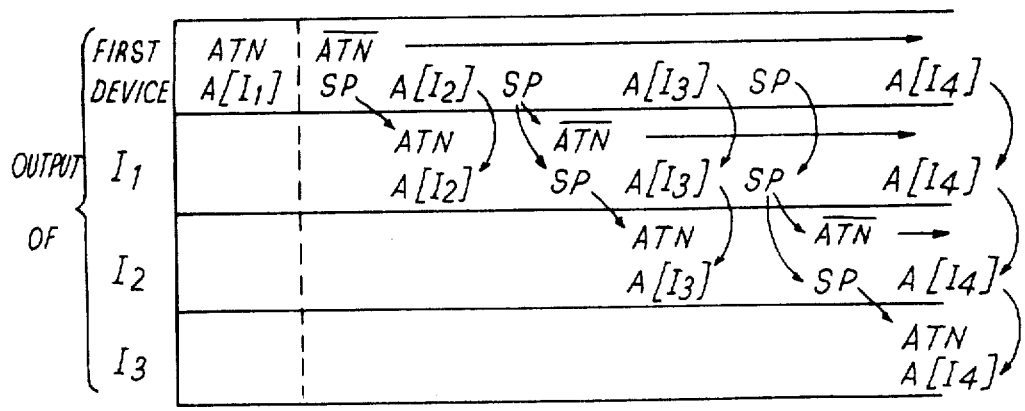

Fig. 3

| HIGHWAY 1 | HIGHWAY 2 |
|---|---|
| CONTROL 1 SENDS I/H ADDRESS. | |
| CONTROL 1 SENDS ENQ. ⟶ | I/H CALLS SRQ LINE. |
| CONTROL 1 UN-ADDRESS I/H. | CONTROL 2 POLLS FOR SOURCE OF SRQ AND IDENTIFIES I/H. |
| | CONTROL 2 READS I/H STATUS. |
| I/H CALLS SRQ LINE. ⟵ | CONTROL 2 SENDS ENQ TO I/H AND WAITS. |
| CONTROL 1 IDENTIFIES SOURCE OF SRQ AND ADDRESSES I/H AS LISTENER. ⟶ | I/H JUST ADDRESSED. |
| CONTROL 1 SENDS SP. ⟶ | INTER-HIGHWAY STATUS. ⟶ ATN APPEARS. |
| ADDRESS OF A. DEVICE 2 ⟶ | DEVICE 2 ADDRESSED AS LISTENER AND WAITS. |
| CONTROL 1 SEND SP. ⟶ | END OF INTER-HIGHWAY STATUS. |
| CONTROL 1 ADDRESSES TALKER ON HIGHWAY 1 AND ENTERS WAIT. | |
| INFORMATION FROM TALKER TO HIGHWAY 2. ⟶ | INFORMATION RECEIVED FROM HIGHWAY 1. |
| UN-ADDRESS TALKER. | |
| RE-ADDRESS I/H. ⟶ | I/H JUST ADDRESSED. |
| SEND SP. ⟶ | INTER HIGHWAY STATUS. ⟶ ATN APPEARS. |
| UNADDRESS LISTENER. ⟶ | DEVICE 2 UNADDRESSED. |
| ADDRESS CONTROL 2. ⟶ | CONTROL 2 ADDRESSED. |
| SEND 'REACTIVATE'. ⟶ | CONTROL 2 REACTIVATED. |
| SEND SP AND UNADDRESS I/H. ⟶ | END OF INTERHIGHWAY STATUS. |
| CONTROL 1 OPERATES HIGHWAY 1 ONLY. | CONTROL 2 OPERATES HIGHWAY 2 ONLY. |

INTERFACE CIRCUIT FOR COMMUNICATING BETWEEN TWO DATA HIGHWAYS

CROSS REFERENCE TO RELATED APPLICATION

U.S. Ser. No. 570,688, filed 28th Apr. 1975, claiming priority from British application 19155/74 dated 1st May 1974.

BACKGROUND TO THE INVENTION

The present invention relates to interfaces for data transmission systems, of the type which comprise a plurality of devices linked by a highway via the interfaces. Devices include data acceptors, which are primarily addressed as listeners, although they may be addressed as talkers in poll and other command operations; data sources, which are primarily addressed as talkers but are also addressable as listeners during command operations; devices which are both sources and acceptors; and controllers which act as talkers and listeners in establishing the operational status of the overall system. A controller is generally also a data source and a data acceptor, and may be a device generally referred to as a data processor or a digital computer.

In operation a controller sets up a status in which one device is a talker and one or more devices are listeners. Data is then transferred from the talker to the listener(s). A system may include more than one controller but only one such device can exercise control at a time.

The invention is to be understood against the state of the art as represented for example by various draft standards being issued by Working Group 3 on Programmable Measuring Apparatus of Technical Committee No. 66 of the International Electrotechnical Commission, in particular the draft identified as 66/WG3 (Secretary) 7 of March 1974.

An interface controls communication between two ports. The term port is used herein to refer collectively to a set of terminals including a plurality of data terminals for bytes of data and a plurality of handshake terminals which are employed in exchanging handshake signals, for example in accordance with the aforementioned draft or in accordance with the invention described in the above-referenced copending Patent Application.

PRIOR ART

In known systems, interfaces are essentially asymmetric circuits having distinct highway and device ports. The highway port is connected to the highway, which has one line for each terminal of the highway port. The device port is connected to a device as defined above. The highway port also includes at least one control or mangement terminal for a special command signal which will be referred to as ATN. A special command means a command carried by a dedicated line. If ATN is true, the accompanying byte of data is interpreted as a command byte which effects a controlling action on one or more interfaces. If ATN is false, the byte is information which is simply transferred without influencing the interfaces, which are said to be data-transparent. It may be that, in terms of the signal levels which represent true and false in a specific system, the signal employed is $\overline{ATN}$. It is then to be understood that $\overline{ATN}$ false and true are exactly equivalent to ATN true and false respectively.

In general, the highway port will usually have other control terminals for special commands such as a terminal for SRQ (service request), IFC (interface clear), REN (remote enable) and EOI (end or identify). IFC places all interfaces in a known waiting state. The device port may also include control terminals for special commands.

In known systems with asymmetrical interfaces, it is clear that a system can only have one highway to which the highway ports of all interfaces are connected. This leads to very severe restrictions, both on account of the known limits on the permissible length of a highway and because no part of the system, other than a device by itself, can operate in a self-contained manner. In practice, it would be desirable for various parts of a complex system to operate as self-contained sub-systems for much of the time and only to intercommunicate at intervals. If all interfaces are connected to a single highway, this is impossible because the highway can only handle one data transfer at a time.

THE INVENTION

The object of the present invention is to provide an interface which can be connected between two highways, as well as between a highway and a device, and which will enable a controller on one highway to exercise control over the other highway.

The present invention thus concerns an interface having two ports, each of which includes data terminals, handshake terminals and at least one control terminal for a special command signal which determines whether a data byte is information or a command. The interface includes status control means responsive to command bytes accompanied by the special command signal received at either port to establish different statuses of the interface, including statuses in which the data terminals of the ports are placed in communication for the flow of data in either selected one of the two directions between the ports. In accordance with the invention, the status control means are constructed to respond to a command byte which addresses the interface, associated with a predetermined signal (of which examples are given below) to enter a particular status in which the interface responds to a byte received at the port at which the interface was addressed to send a modified byte as a command byte from the other port.

The invention can be contrasted with the prior art as follows. In the prior art, a data byte sent to an interface either passes through the interface, if it is an information byte, or stops at the interface, if it is a command byte and, in this event, exercises a control action if it is a universal command (applicable to all interfaces) or if it is an addressed command and is addressed to that interface. It is not possible to transmit a command byte through an interface and a controller on one highway cannot, therefore, exercise control through an interface on a second highway.

In the present invention, once an interface has been placed in the described status, which will hereinafter be called the interhighway status or just-addressed status, it will receive a byte and send it on as a command byte. In one embodiment of the invention, the bytes which are sent to the interface when it is in the inter-highway status may be sent with ATN false. The bytes are then transmitted to the interface as if they were data bytes, but because the interface is in the inter-highway status, they have ATN added to them at the port acting as the output port and, therefore, emerge as command bytes.

However, the bytes can be sent as secondary commands with ATN true, being converted to primary commands by the interface in interhighway status.

The predetermined signal which causes entry to the inter-highway status can be a predetermined byte following on the command byte which addressed the interface. It will be convenient to refer to this alternative as the first version of the invention.

The predetermined command byte can then be any convenient byte not already having an assigned command function. A convenient byte is that corresponding to the character SP, (0100000 in ISO-7 bit code). Preferably, the interface enters the inter-highway status only when this command byte follows immediately on the address command byte. The interface may be caused to leave the interhighway status by use of any convenient command, for example a repetition of the same pedetermined byte.

Alternatively, the predetermined signal can be one bit of the byte which addresses the interface. This will be called the second version of the invention. For one value of this bit, the predetermined signal is absent and the byte is a normal addressing command.

For the other value of the said one bit, the predetermined signal is present and the byte is treated as an intermediate address command which puts the addressed intermediate interface into the inter-highway status.

DRAWINGS

The invention will now be described in more detail, by way of example, with reference to the accompanying drawings, in which:

FIG. 1 is a simplified schematic block diagram of an interface embodying the invention;

FIG. 2 shows a data transfer system composed of two sub-systems linked by the interface;

FIG. 3 is a table of a typical sequence of control operations applicable to the system of FIG. 2 for the case of the first version of the invention;

FIG. 4 shows a system like that of FIG. 2 but wherein two devices are connected through more than two highways in tandem;

FIG. 5 shows the sequence of commands used in the system of FIG. 4 to establish communication from one device to the other, again using the first version of the invention;

DETAILED DESCRIPTION

Figure 6:
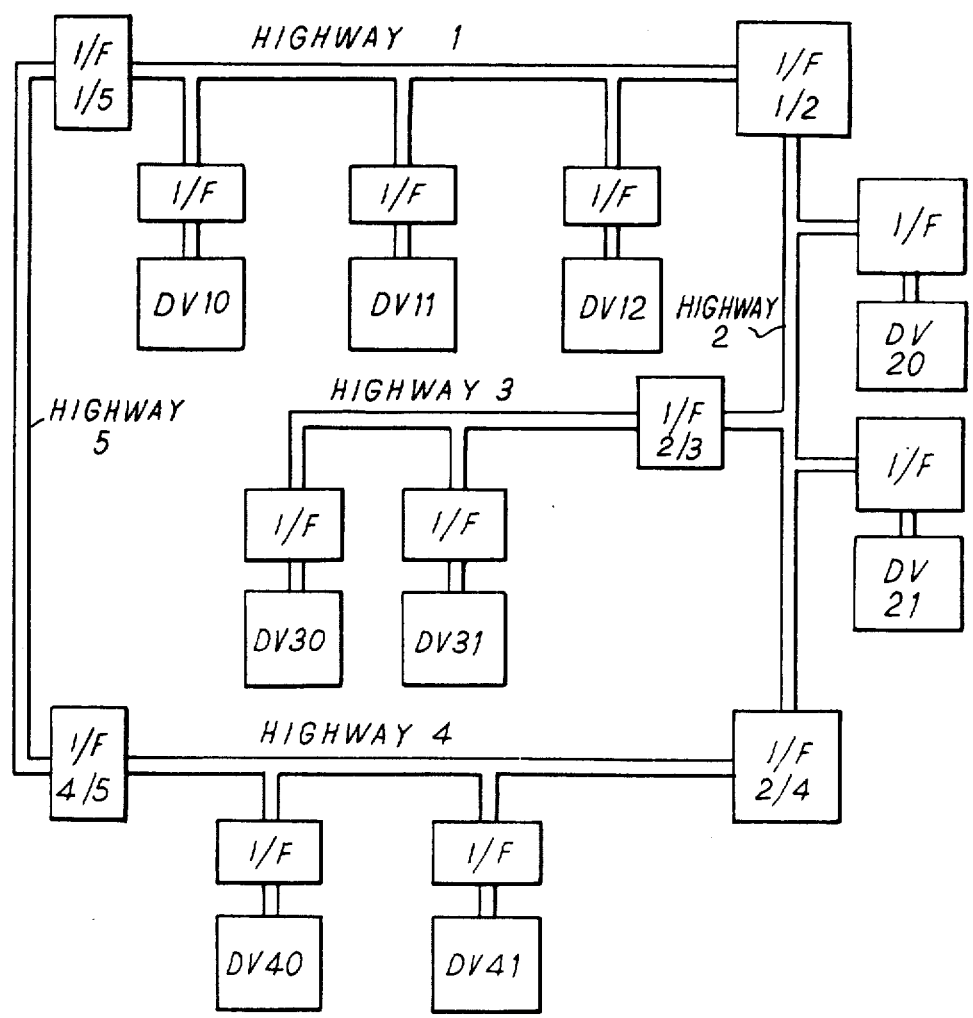
FIG. 6 is a schematic diagram of a more complex system with five highways.

In order not to encumber the disclosure unnecessarily, no detailed description will be given of the constituent circuits of the interface. These are arranged to perform the described functions in ways which are well known in themselves. The invention is not concerned with the handshake process and the terminals therefor are not described. It is assumed that each port has its handshake terminals and handshakes on its side of the interface in a manner generally known per se and specifically as described in the aforementioned Patent Application, for example.

Table I below sets out the meaning of data bytes which are interpreted as commands (being accompanied by ATN true). It is assumed that a 7-bit code with bits $b_1$ to $b_7$ is employed, plus a parity bit $b_8$ which will be ignored in what follows. Data bytes with ATN false have the usual ISO-7 bit code meaning, e.g. as set out in the aforementioned draft.

TABLE 1

| BITS | | | | COMMAND | |
|---|---|---|---|---|---|
| $b_7$ | $b_6$ | $b_5$ | $b_4-b_1$ | TYPE | NOTATION |
| 0 | 0 | 0 | All values | Addressed Commands | 0.0 to 0.15 |
| 0 | 0 | 1 | All values | Universal Commands | 1.0 to 1.15 |
| 0 | 1 | 0 | All values | Intermediate Listen Addresses | 2.0 to 2.15 |
| 0 | 1 | 1 | 0000 to 1110 | Terminal Listen Addresses | 3.0 to 3.14 |
| 0 | 1 | 1 | 1111 | Unlisten | 3.15 |
| 1 | 0 | 0 | All values | Intermediate Talk Addresses | 4.0 to 4.15 |
| 1 | 0 | 1 | 0000 to 1110 | Terminal Talk Addresses | 5.0 to 5.14 |
| 1 | 0 | 1 | 1111 | Untalk | 5.15 |
| 1 | 1 | 0 | All values | Secondary Commands, Group 1 | 6.0 to 6.15 |
| 1 | 1 | 1 | All values | Secondary Commands, Group 2 | 7.0 to 7.15 |

Universal commands (1.0 to 1.15) are obeyed by all interfaces receiving them and include, for example, LLO (Local Look-out) as 1.1 and other commands tabulated in the aforementioned draft. Unlisten (3.15) and Untalk (5.15) are universal commands.

Addressed commands (0.0 to 0.15) are obeyed only be interfaces which have been previously selected by addressing and include, for example, GTL (Go to Local) as 0.1 and other commands tabulated in the aforementioned draft.

The terminal listen and talk addresses 3.0 to 3.14 and 5.0 to 5.14 enable up to 15 devices to be addressed on one highway as terminal interfaces. The intermediate listen and talk addresses 2.0 to 2.15 and 4.0 to 4.15 (of which 2.15 and 4.15 are actually unusable) are employed in the second version of the invention to cause entry to the inter-highway status by virtue of the fact that $b_5 = 0$ is used as the predetermined signal referred to above. The addresses 2.0 etc., 3.0 etc., 4.0 etc., and 5.0 etc., will be called primary addresses.

The two groups of secondary commands 6.0 to 6.15 and 7.0 to 7.15 are used, as described below, when an interface is in the inter-highway status. This does not preclude their additional use as suggested in the aforesaid draft following the addressed command 0.5 which specifically requires a secondary command. From now on, a secondary command will be called a secondary address when it is an address command. A secondary command following an address is a secondary address. A secondary command following a non-address command (such as 0.5) is a secondary command other than a secondary address.

Referring to FIG. 1, it will be understood that the majority of the drawn lines represent a plurality of electrical lines in parallel. In view of the symmetry of the interface, the circuits pertaining to the two ports, referred to as port 1 and port 2, are given the same references followed by (1) or (2) as the case may be. In the description, these distinguishing bracketed numerals are omitted when it is unnecessary to preserve a distinction.

Each port has a plurality of data terminals 10, an ATN terminal 11 and an SRQ terminal 12 and may have other terminals dedicated to other special commands. There are eight data terminals assuming that data is represented in accordance with ISO-7-bit codes, plus a parity bit.

The data and control terminals 10, 11 and 12 are connected to input-output gating 13 which determines the routing of signals under control of status control means. The status control means are represented by four entities, namely, an own address source 14, a decoder 15 (typically an ROM which may be of the type disclosed in "Semiconductor Memory Design and Application," by Luecke, Mize and Carr, published by McGraw Hill in 1973), status circuits 16 and an inter-highway status circuit 16a which is shown separately from the other status circuits in view of its significance in the present invention.

If incoming data is command data (ATN true), the gating 13 routes the data byte to a command data channel 17 leading to the decoder 15. The decoder decodes the interface message in combination with the existing status of the interface held by status circuits 16 and institutes whatever change of status is necessary. If the message is the interface's own talk or listen address, it is recognised by the combination of the appropriate bits $b_6$ and $b_7$ with the bits $b_1$ to $b_4$ unique to the interface, the latter bits being applied, in manner known per se to a comparator 18 included in the decoder 15. The comparator compares the address bits $b_1$ to $b_4$ with the interface's own address provided by source 14 and issues a true signal when a match occurs.

In the first version of the invention, $b_5$ may be used as an additional address bit.

Although, for convenience, the own address source 14 and comparator 18 are drawn separately in respect of each port, these entities can be provided singly and be shared by the status control means for the two ports. The decoders 15 and status circuits 16 and 16a are, however, to a large extent functionally independent although they may obviously be physically integrated, especially if the interface is implemented as an IC chip. However, there is some interaction between the status circuits 16(1) and 16(2) as represented by a connection 19 in order to prevent either circuit entering a status incompatible with that already held by the other. Other interaction involved in the inter-highway status will be described below.

Each of the status circuts 16 comprises, in a manner well known and not, therefore, described in detail, a plurality of bistable flip-flops and associated logic. These flip-flops store states such as ADDRESSED/-NOT ADDRESSED, and TALKER/LISTENER. It is will be convenient now to consider specifically the situation when the interface is addressed on port 1; the same considerations apply mutatis and mutandis if it is addressed on port 2. When the interface is addressed, status circuits 16(1) will store ADDRESSED and either TALKER or LISTENER depending on whether the address byte had $b_7 = b_6 = $ b 1. If the state is LISTENER, gating circuits 13 are set to allow data to flow from port 1 to port 2. If the state is TALKER, gating circuits 13 are set to allow data to flow from port 2 to port 1.

In the present embodiment it is assumed that the data flow is through a silo store 20, that is to say a store capable of buffering a plurality of bytes on a first-in, first out basis. In a simpler embodiment a single byte buffer may be employed and it may even be feasible to transfer the data without buffering. However a silo store assists in rendering the transfer of data between a source and acceptor having different data rates less wasteful of highway time, in a manner known per se.

If either of the status circuits 16(1) or 16(2) has called for data flow from, say, port 1 to port 2, data flows from circuits 13(1) via an information channel 21(1), to which bytes unaccompanied by ATN are routed, to the silo store input 22. The data leaving the store on output 23 flows through channel 24(2) to gating circuits 13(2) and thence to port 2.

The status circuts 16 always cause the gating circuits 13 to open up a path for SRQ from port 2 and port 1 if the interface has been addressed on port 1 and from port 2 if the interface has been addressed on port 2. Thus SRQ can be returned to the active controller at any time that a service request situation arises, following known practice. The interface itself can also send back SRQ, from the status control means, if it receives a command incompatible with its existing status or otherwise reaches an impasse. This procedure includes known servicing of the store 20 in accordance with signals E = NOT EMPTY and F = FULL. If F becomes true, further entry of data from the port acting as input is suspended, by locking out the handshaking. So long as E is true, the interface is prevented from changing from TALKER to LISTENER.

With this background, the inter-highway status of the interface can now be described. The main element of each inter-highway status circuit 16a is a flip-flop which is normally in the state INTER-HIGHWAY false. Assume that the first version of the invention applies and that the interface is addressed as a listener on port 1, (again the description applies mutatis mutandis if it is addressed on port 2), circuits 16(1) will enter a JUST ADDRESSED status. The next byte will leave circuits 16(1) in the ADDRESSED status (that is until the command UN-LISTEN is received as explained in the aforementioned draft) but will put JUST ADDRESSED false. If the data character SP = SPACE is received in the JUST ADDRESSED status, without ATN, it is utilised to set the flip-flop of the inter-highway status circuit 16a(2) to INTERHIGHWAY true. To this end, the information channel 21(1) from gating 13(1) is also connected to decoder 15(1) by path 25(1) so that bytes unaccompanied by ATN may actually be interpreted as command bytes during the JUST ADDRESSED status (and also during the INTER-HIGHWAY status). Further to the described end, status circuits 16(1) and 16(2) exercise control over inter-highway status circuits 16a(2) and 16a(1) respectively over connections 26(1) and 26(2) respectively.

When INTER-HIGHWAY (2) is true, it forces ATN of port 2 true by way of a line 27(2). The interface is set up to transfer data from port 1 to port 2. Accordingly, the interface is in a status in which it will receive bytes at port 1 and send them on from port 2 properly accompanied by ATN since ATN has been forced true at port 2 by circuit 16a(2). In the first version of the invention, secondary addresses are sent to the interface in inter-highway status without ATN true and, therefore, look like information bytes. However, because the interface transmits them with ATN true, they are converted into proper primary addresses accompanied by ATN true.

In the second version of the invention, each inter-highway status circuit 16a is simply controlled (from the decoder 15) in dependence upon the value of the bit $b_5$, INTER-HIGHWAY for the addressed port being set true when $b_5 = 0$.

In the Inter Highway status secondary addresses are retransmitted as the equivalent primary addresses while $b_5 = 1$, but a secondary address with $b_5$ 32 0 is retransmitted as a primary address and then the interface enters a status which may be termed the "just addressed transparent status." In the just addressed transparent status secondary addresses are transmitted unaltered until a primary command or address is received when the interface enters the addressed status.

When the interface is used to connect one highway to another it may be required to place a command on a remote bus without affecting the buses used in the transmission route. If the interface is then addressed with $b_5 = 1$ it will retransmit any secondary commands received as primary commands until it receives a primary address or command which causes it to enter the addressed status.

The character SP is also used in the first version of the invention to terminate the INTER-HIGHWAY status, i.e. when SP is received in this status it terminates the status.

The character SP may thus be said to be an encoded version of ATN, but only in the statuses JUST ADDRESSED and INTER-HIGHWAY. An encoded version of SRQ is also used to enable service requests to be sent in the forward direction. This will become apparent from the following description of ways in which the interface may be used.

Firstly, it can be pointed out that the interface can be used in conventional manner between a highway and a device. The facility provided in accordance with the invention is then simply not required and no use is made of it.

FIG. 2 shows a system consisting of two sub-systems 1 and 2, each of which can be regarded as a conventional system having a plurality of devices connected to a corresponding highway having data lines D, control lines C and handshake lines H, through interfaces 30. Within each sub-system only three devices are shown for simplicity, one of the three being a controller 31, the others being source and/or acceptor devices 32.

For much of the time each sub-system will function as a self-contained system, controlled by its own controller 31. From time to time communication between the two sub-systems is required and to this end the two highways are interconnected by an interface 33 of the nature described with reference to FIG. 1. Ports 1 and 2 connect to sub-systems 1 and 2 respectively. When the sub-systems are acting as self-contained systems, the interface 33 is completely inactive. One of the controllers may however activate the interface 33 and assume overall control of the system. For purposes of explanation this will be assumed to be controller 1. A control signl IFC (interface clear) can pass between the highways at any time in order that controller 1 may have the over-riding control.

If an operation requires data to be sent between the two sub-systems, the connecting interface 33 must be enabled but this must be done in such a way that the two controllers are not active together. This statement stems from the consideration that once the two highways are joined, the whole system is one and must have one control and no more. The mechanics of handover will vary depending upon the type of operation required but essentially the controller 1 must alert the controller 2 by addressing the connecting interface and commanding it to ask for service in the other highway. This command will take the form of a predetermined character ENQ which is transmitted to the interface, decoded and passed on as the single line Service Request SRQ. A poll informs the controller 2 that an inter-bus message is available or required and subsequent addressing and programming results in the controller 2 becoming inactive and the controller 1 setting up a transmission path and supervising the transfer of data. When this process is complete the inactive controller 2 may be reactivated and the two highways isolated.

FIG. 3 shows a typical series of operations in tabular form, it being understood that operations flow generally down the table and across the table as shown by arrows. ENQ represents the encoded form of SRQ. I/H denotes the inter-highway interface 33. Controller is abbreviated to control.

A more concise method of establishing a path between the two highways would involve both controllers remaining active once the signalling SRQ has been sent and received. The transmitting side would then address the interface as a listener and commence transmission until the silo store therein is filled; the receiving side would address the interface as talker and allocate its own receiver which would receive information until EOI (end or identify) when the interface would be un-addressed. In this application both sides would need to know the precise intentions of the other.

In summary, therefore, it is possible to obtain access from one highway to another through an inter-highway interface. The functions used for this are the coded SRQ (i.e. ENQ) and the coded ATN (i.e. SP) signals, which messages are translated by an active interface into the corresponding single line control functions SRQ and ATN and then serve to condition the transmission of further information. SRQ is a straight transfer which occurs when ENQ follows immediately on the interface listen address, SRQ being put out on the port other than that which was addressed, irrespective of whether the said other port has talker, listener or un-addressed status.

If however SP follows the interface address immediately on one port, the interface turns the other port to talk and puts out ATN on this latter port. Should this port be engaged in some other communication or access be impermissible, SP is not interpreted and SRQ is transmitted back towards the source of SP.

When conditions have been so established that there is an active controller to one side only of the interface, the SP character enables command of the highway to the other side of the interface to be asserted. In fact it is possible to build up hierarchical systems of highways involving tandem and/or branching coupling of highways. Thus SP can be routed through more than one inter-highway interface to call up ATN and, on retransmission, to terminate ATN. When ATN has been terminated on the non-addressed port of any interface it merely serves to retransmit all data bytes until it is itself commanded by a byte accompanied by ATN.

FIG. 4 illustrates how it is possible to communicate from a first device 40 to a second device 41 through three tandem highways 42, 43 and 44, via device-to-highway interfaces $I_1$ and $I_4$ and interhighway interfaces $I_2$ and $I_3$, all interfaces being of the type already described. FIG. 5 tabulates from left to right the sequential outputs of the first device and the consequent outputs of interfaces $I_1$, $I_2$ and $I_3$, that is to say on the right-hand ports in the drawing. The symbolism A [] is utilised to denote "address of . . . ."

Whenever the message path encounters an obstruction, such as an interface already primed in the wrong direction, SRQ is passed back towards the source of that message path. In general SRQ, in its unencoded form, may pass only against the direction of setting up of the message path, i.e. towards the active controller. A controller may direct a message to be transmitted towards itself by commanding a string of talkers. SRQ will still pass towards the controller but in this case the data also passes in this direction.

FIG. 6 illustrates a more complex system. For simplicity, the representation of highways is reduced, as in FIG. 4, to a double line and the number of devices on a highway is less than would typically be encountered in practice. Highways are labelled HIGHWAY 1 to 5 and devices are given a two digit number preceded by the letters DV, the first digit being the same as the highway to which the device is connected. Device-highway interfaces are simply denoted I/F. Inter-highway interfaces have two digits added in accordance with the highways which they connect.

The preferred mode of operation is that each highway sub-system includes a degree of control and can operate in a self-contained manner without constant interaction with the adjacent sub-systems. However, from time to time a controller on one highway will address an inter-highway interface and, by the described use of SP and ENQ obtain access to an adjacent highway and, if need be by extension of the principle (as in FIGS. 4 and 5) to a further highway or highways. For example, let DV10 be a controller which normally only controls itself, and DV11 and DV12. Assume that it needs, however, to get DV31 to talk to DV11. It addresses 1/F-½ and by use of SP and ENQ as described gets access to and takes over command of highway 2, with ATN placed on highway 2 from 1/F-½. The controller DV10 then addresses 1/F-⅔ and extends command to highway 3 with ATN now placed on highway 3. The controller then addresses DV11 as a listener and finally addresses DV31 as a talker to allow data to pass from DV31 to DV11.

During all of this the sub-system of highway 4 can continue to function in self-contained manner. As illustrated, highway 5 has no devices thereon. It is merely provided as an alternative link between highways 1 and 4, not involving highway 2.

The own address source 14 of FIG. 1 may be simply a set of five terminals wired to the high and low signal levels of the circuit to wire in the interface's own address as defined by $b_1$ to $b_5$. However, greater flexibility of programming may be achieved if the source 14 is actually a register constituting an acceptor device having its own interface connected to the highway, so that the controller of the highway can transmit an address code to the register and thereby set up in an alterable manner the address of the interface for which the register constitutes the address source.

In the foregoing description, special functions have been attributed to the characters SP and ENQ when used in a particular way. It will be appreciated, however, that different characters, other than SP and ENQ, could be used for these functions instead.

In the second version of the invention, essentially the same results are achieved as in the first version but making use of the bit $b_5$ instead of the coded version of ATN, i.e. the character SP.

In the second version of the invention, a functional distinction is drawn between a terminal interface (between a highway and a device) and an intermediate interface (between two highways). To this end, the own address source 14 of FIG. 1 is wired up not only with the address bits $b_1$ to $b_4$ but with the bit $b_5$ which is 1 for a terminal interface and 0 for an intermediate interface.

The value of this bit is communicated to the status circuits 16 by connections 14a shown in broken lines because they apply only to the second version of the invention. The status circuits 16 are additionally responsive to the value of $b_5$ in such a way that a terminal interface ($b_5 = 1$) is incapable of passing on a control byte whereas an intermediate interface ($b_5 = 0$) is so capable.

Turning from the wired-in addresses to the transmitted addresses (data bytes), the distinction between primary and secondary addresses has already been made and can be seen from Table I to depend on the value of bits $b_6$ and $b_7$. Equally, the distinction between intermediate and terminal addresses has been explained and depends on the value of the bit $b_5$ (Table I). It is a straightforward matter of circuit logic to render the operations of the status circuits 16 dependent upon the values of these bits as well as the value of the wired-in bit $b_5$. A terminal interface can only be addressed by primary terminal addresses. However, the status circuit logic is arranged to yield the following operations for an intermediate interface.

An intermediate interface addressed with its intermediate address will enter the inter-highway status as explained in relation to FIG. 1. In this status it will respond to secondary addresses 6.0 etc., and 7.0 etc., and retransmit them as primary intermediate and terminal addresses respectively (by changing the bit $b_6$ or bit $b_7$).

The status circuits additionally act in conjuction with the input output gating to cause a secondary address to become a primary listen address or a primary talk address in dependence upon whether the intermedate interface which effects the conversion has been addressed as a listener or a talker.

Although secondary addresses are retransmitted as primary addresses in the inter-highway status, the first secondary intermediate address to be received also terminates the inter-highway status. This address itself is re-transmitted as a primary address but, the termination of the inter-highway status causes all subsequent secondary addresses to be transmitted unchanged, i.e. as secondary addresses (just addressed transparent status).

Figure 7:
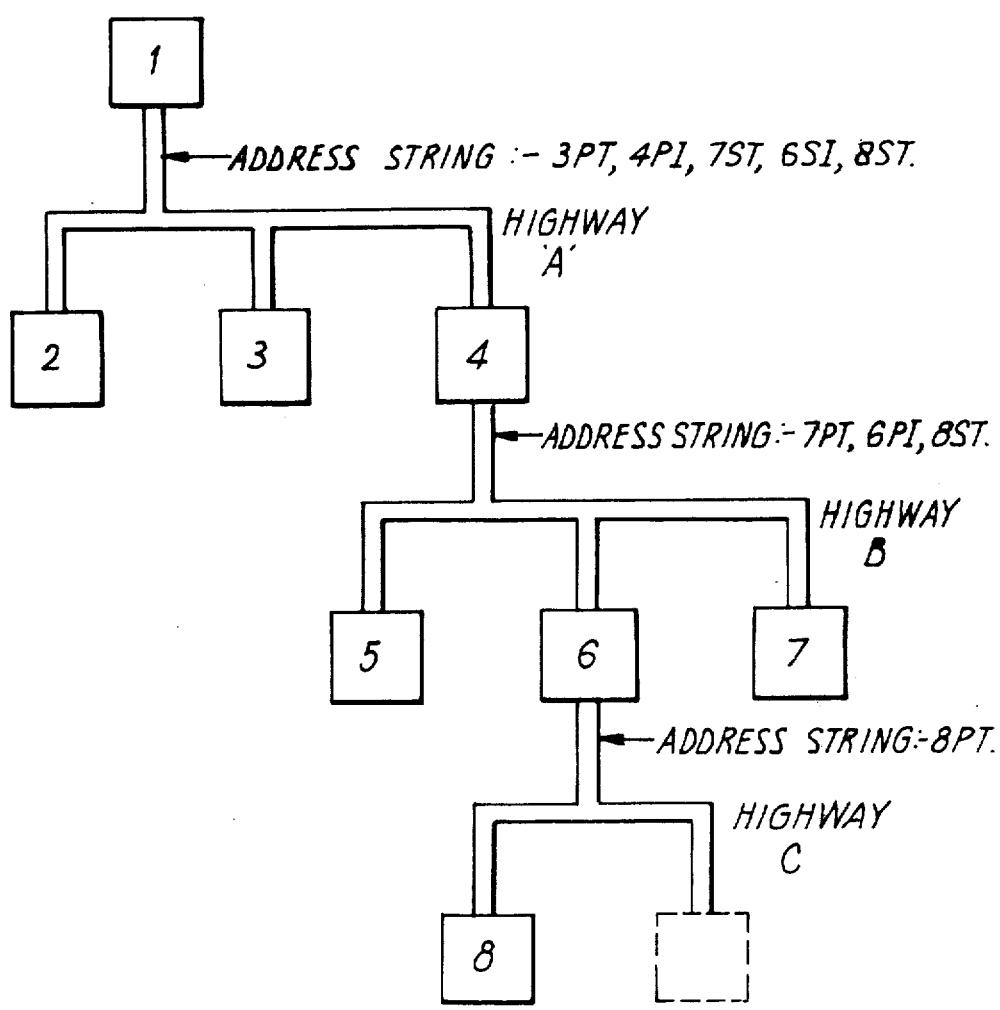
FIG. 7 is a schematic diagram of a system operating with the second version of the invention.

An example of a system operating on the basis just explained will be explained with reference to FIG. 7. The system is shown as a branching system of three highways A, B and C linking interfaces 1 to 8 of which interfaces 4 and 6 are intermediate interfaces and the remainder are terminal interfaces and whose blocks may be assumed in FIG. 7 to represent both terminal interface and device. For simplicity of description, all interfaces have been given different numbers (addresses). In practice, interfaces on different highways can have the same numbers.

It will be convenient to use letter symbols to characterize the classes of addresses as follows:

TABLE II

| | |
|---|---|
| P | Primary |
| S | Secondary |
| T | Terminal |
| I | Intermediate |

3PT for example means the primary terminal address for interface 3, namely the address ??10011, where the question marks indicate that $b_6$ and $b_7$ may be either 01 or 10 depending on whether the address is a listen or talk address. It will be assumed that interface 1 is the controller and that it wishes to address interfaces 3, 7 and 8 as listeners.

The controller emits the address string 3PT, 4PI, 7ST, 6SI, 8ST, 3PT and 4PI being listen addresses. The primary terminal address 3PT addresses the interface 3 whose device is placed in readiness to listen. The primary intermediate address 4PI addresses the interface 4 as a listener and places it in inter-highway status. The secondary terminal address 7ST is, therefore, retransmitted as the primary terminal listen address 7PT, leaving interface 4 still in inter-highway status. 7PT addresses interface 7 as a listener.

The secondary intermediate address 6SI is re-transmitted by interface 4 as the primary listen address 6PI and also terminates the inter-highway status of the interface 4. 6PI addresses interface 6 and places it in inter-highway status, addressed as a listener. 8ST now passes through interface 4 unchanged but is converted by interface 6 to the primary listen address 8PT, because it is interface 6 which is now in inter-highway status. Finally, 8PT addresses interface 8 and interfaces 3, 7 and 8 are all addressed.

The string of addresses discussed above must then (unless it is the controller itself which wishes to talk) be followed by an address or address string for the talker. If, for example, device 5 is to talk, the string to be used is 4PI (talk), 5ST, the latter becoming 5PT (talk).

What is claimed is:

1. An interface comprising two symmetrical ports connectable to data highways, each of said ports including data terminals, handshake terminals, at least one control terminal to which can be applied a special command signal indicative of whether a data byte on said data terminals is information or a command, and status control means responsive to command bytes accompanied by said special command signal received from a data highway at either port to establish different statuses of the interface, including statuses in which the data terminals of the ports are placed in communication for the flow of data therebetween; means responsive to a predetermined command byte on one of said data highways which addresses the interface at one of said ports for causing the interface to enter a particular status; and means responsive to the existence of said particular status and a byte received from said one data highway at said one port for generating a modified byte as a command byte at the other port.

2. An interface according to claim 1 wherein said means responsive to a predetermined command byte is operative in response to the value of a given bit of the command byte.

3. An interface according to claim 2 wherein the interface includes means for storing its own address as a plurality of address bits with numerical significance plus said given bit, and a comparator for comparing the corresponding bits of received data bytes with said own address to determine whether or not the interface is being addressed.

4. An interface according to claim 3 wherein said means responsive to a predetermined command byte is adaptable, by preselecting one value of the given bit of said own address, to be rendered incapable of entering said particular status.

5. An interface according to claim 1 wherein the status control means, when in the particular status, is operative, in response to certain secondary address commands received from said one data highway at said one port and incapable of directly addressing an interface, to cause the issuance from the other port of a corresponding modified primary address command capable of directly addressing an interface.

6. An interface according to claim 5 wherein the status control means, when in the particular status, is operative to respond to certain other secondary address commands to cause the interface to enter a status wherein subsequent secondary address commands received at said one port are issued from the other port without modification.

7. An interface according to claim 1 wherein said means responsive to said predetermined command byte includes means for causing application of the special command signal to the control terminal of the other port.

8. An interface comprising two symmetrical ports connectable to data highways, each of which includes data terminals, handshake terminals, at least one control terminal to which can be applied a special command signal indicative of whether a data byte on said data terminals is information or a command, and status control means responsive to command bytes accompanied by said special command signal received from a data highway at either port to establish different statuses of the interface, including statuses in which the data terminals of the ports are placed in communication for the flow of data therebetween; means responsive to a predetermined byte on one of said data highways which addresses the interface at one of said ports for causing the interface to enter a particular status; and means responsive to the existence of said particular status and a byte received from said one data highway at said one port for applying the special command signal to the control terminal of the other port and a command byte to the data terminals of the other port.

9. An interface according to claim 8 wherein said means responsive to a predetermined command byte is responsive to a sequence of a command byte which addresses the interface followed by the predetermined byte.

10. An interface according to claim 9 wherein said predetermined byte of said sequence is unaccompanied by said special command signal.

11. An interface according to claim 8 wherein the status control means, when in the particular status, is operative in response to bytes received from said one data highway at said one port without the special command signal to cause the issuance from the other port of the received byte accompanied by the special command signal.

* * * * *